(12) United States Patent
Maddox et al.

(10) Patent No.: US 6,311,593 B1
(45) Date of Patent: Nov. 6, 2001

(54) POST MOLDING INNER DIAMETER NECK TRIMMING APPARATUS

(75) Inventors: A. Dale Maddox, Tecumseh; James E. Thompson, Novi, both of MI (US); Thomas A. Shapler, Bowling Green, OH (US)

(73) Assignee: Uniloy Milacron, Inc., Manchester, MI (US)

( * ) Notice: Subject to any disclaimer, the term of this patent is extended or adjusted under 35 U.S.C. 154(b) by 0 days.

(21) Appl. No.: 09/584,898

(22) Filed: May 26, 2000

Related U.S. Application Data

(63) Continuation of application No. 09/172,889, filed on Oct. 15, 1998, now Pat. No. 6,158,317.

(51) Int. Cl.[7] .................................................. B26F 1/02
(52) U.S. Cl. ............................... 83/136; 83/681; 83/914; 83/946; 425/527; 425/806
(58) Field of Search ..................... 83/946, 136, 681, 83/914, 682, 111, 100, 54; 264/536; 425/806, 527

(56) References Cited

U.S. PATENT DOCUMENTS

| | | |
|---|---|---|
| 3,038,200 | 6/1962 | Whitbourn . |
| 3,108,374 | 10/1963 | Bowman et al. . |
| 3,145,243 | 8/1964 | Hagen . |
| 3,369,272 | 2/1968 | Martin et al. . |
| 5,664,471 | 9/1997 | Dundas . |
| 5,682,804 | 11/1997 | Moore . |
| 5,749,275 | 5/1998 | Dundas et al. . |
| 5,791,217 | 8/1998 | Dundas et al. . |
| 6,158,317 | * 12/2000 | Maddox et al. . |

* cited by examiner

*Primary Examiner*—Kenneth E. Peterson
(74) *Attorney, Agent, or Firm*—Brinks Hofer Gilson & Lione

(57) ABSTRACT

An apparatus for trimming the neck of a blow molded plastic bottle in which a reverse punch is mounted on an end of a shaft. A knife is also mounted to the shaft adjacent to the reverse punch and includes a cutting edge recessed from the cutting edge of the reverse punch. A stripper arm is mounted on the shaft and axially moves with the shaft. The stripper arm's distal end is adjacent to the reverse punch and recessed from the cutting edge of the reverse punch. An actuator causes the distal end of the stripper arm to move to a position located radially outward from the cutting surface when a trimmer ring from the neck of a bottle is to be removed from the apparatus.

6 Claims, 4 Drawing Sheets

POST MOLDING INNER DIAMETER NECK TRIMMING APPARATUS

This is a continuation of U.S. Pat. application No. 09/172,889, filed Oct. 15, 1998, now U.S. Pat. No. 6,158,317.

BACKGROUND OF THE INVENTION

1. Field of the Invention

The present invention relates to an apparatus for trimming the neck of a blow molded plastic container. More specifically, the present invention relates to a post molding apparatus for trimming a plastic ring from the inner diameter of the neck of a blow molded plastic container to provide a clean circular sealing surface for engagement with a sealing cap.

2. Description of the Prior Art

Plastic containers, such as containers filled with milk and other liquids, are typically blow molded. If the container is blow molded with a blow pin, neck finishing is often accomplished using a pull up or ram down shearing tool on the blow pin. However, some containers are blow molded through use of blow needles and these containers require removal of the container from the blow mold for post mold trimming. During post mold trimming, a blow dome attached to the container is first removed through a guillotine or spin trimming operation. With the blow dome removed, small V-grooves in the inner circumference of the sealing flange of the neck can be seen and are an inherent result of the blow molding process. The V-grooves, located 180° apart (where the pinch-off of the mold halves compress the molten parison) create a disruption in the sealing surface of the container and can cause leakage around the cap.

Two type of caps are typically employed to seal such containers and these include a linerless threaded cap and a snap-on cap. With a linerless threaded cap, the cap is threaded onto the external threads of the container neck and an interiorly formed ring on the cap extends inside of the sealing flange of the container. Preferably, the ring contacts the interior edge of the sealing flange forming a seal closing off the bottle. Clearly, the V-grooves mentioned above might compromise the sealing capability of such a cap. The same is true for snap-on caps. These caps also include an interior ring which extends inside of the sealing flange to engage against the interior edge forming a seal that closes off the container.

In order to ensure that the V-grooves do not compromise the sealing capabilities of the container and cap, the inner diameter of the sealing flange is finished in a post molding operation. Removal of the V-grooves can be done by a reaming and/or facing process. During reaming, a reamer extends into the opening and cuts away portions of the neck flange. However, this generates plastic chips which can enter into the container. The chips must then be removed. Otherwise, the product is contaminated.

In view of the drawbacks and limitations of the prior art, it is seen that there exists the need for a simplified trimming apparatus which provides for a clean inner diameter in the sealing flange of a blow molded container.

It is therefore a principle object of the present invention to provide a trimming apparatus which fulfills that need.

Another object of the present invention is to provide an inner diameter neck trimming apparatus which forms a precise, uniform aperture in the sealing flange of the container without creating chips of plastic material which can potentially enter into the bottle.

A further object of this invention is to provide such a mechanism with a compact construction, minimal complexity, low cost, easy servicing requirements and the potential for retrofiltering into existing machinery.

SUMMARY OF THE INVENTION

The neck trimming apparatus according to the present invention trims a continuous ring of material from the inner diameter of the sealing flange utilizing a reverse punch. The punch is mounted on the end of a shaft and includes a trailing edge that defines the cutting surface of the punch. The neck of the container is held within a nest, with its sealing flange being adjacent to a die. The punch is advanced through the opening in the die with its cutting surface being moved to a position within the neck of the container and the untrimmed sealing flange. Upon withdrawal of the punch out of the neck of the container, the cutting surface of the punch, in cooperation with the die, trims a ring of material from the inner diameter of the sealing neck leaving a clean circular opening in the sealing flange. The severed ring is continuous and is retained around the shaft, above the punch, by virtue of an undercut formed in the shaft relative to the outer diameter of the punch. Mounted to the shaft, generally adjacent to the punch, is a knife having a cutting edge facing outward from the shaft. On the opposing side of the shaft, and also mounted thereto, is a stripper arm. The stripper arm is pivotably mounted to the shaft with one end being located adjacent to the punch. The opposing end of the arm is biased laterally outward by a spring such that the end adjacent to the punch is biased against the shaft.

In order to remove the ring from about the shaft, an actuator engages and pushes on that end of the stripper arm away from the punch. This causes the arm to pivot about its pivot point with the end of the stripper arm adjacent to the punch being pivoted laterally away from the shaft. This action pushes on the ring causing the opposite side of the ring to engage the cutting edge of the knife, severing the ring and thereby allowing it to be removed from around the shaft.

Additional benefits and advantages of the present invention will become apparent to those skilled in the art to which the present invention relates from the subsequent description of the preferred embodiment and the appended claims taken in conjunction with the accompanying drawings.

DETAILED DESCRIPTION OF THE PREFERRED EMBODIMENT

Figure 1:
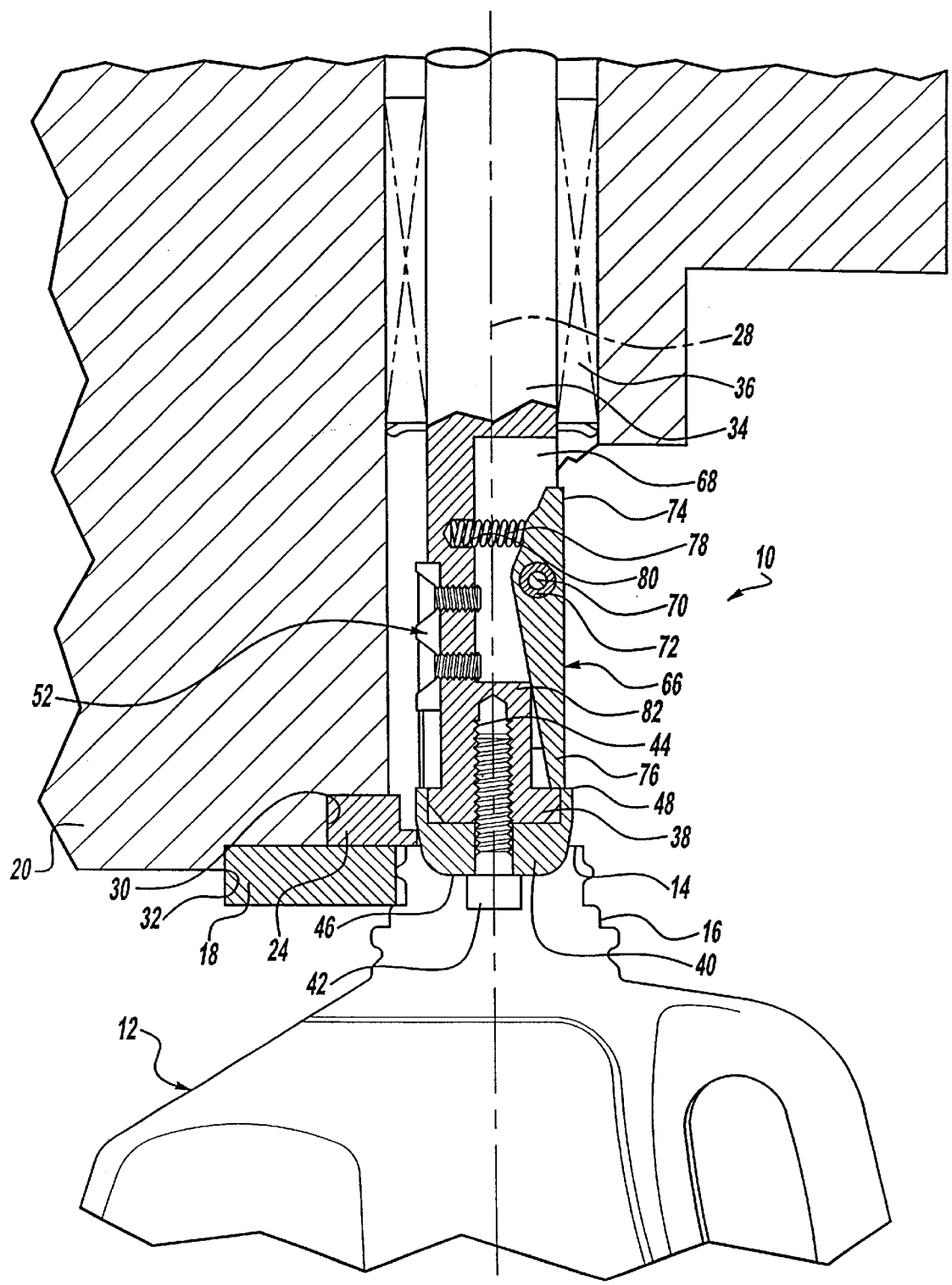
FIG. 1 is a partial sectional view through a post molding inner diameter neck trimming apparatus according to the principles of the present invention and illustrating the punch prior to insertion into the neck of the container.

Referring now to the drawings, a post molding inner diameter neck trimming apparatus according to the principles of the present invention is illustrated in FIG. 1 and generally designated at 10. The apparatus 10 is a post molding station which trims a container 12, and more specifically, trims the inner diameter of a sealing flange 14 on the neck 16 of the container 12.

The container 12 illustrated in the figures is a one gallon dairy container blow molded out of a plastic material such as polyethylene. When initially molded, the container 12 has attached to the uppermost portion of its neck 16 a blow dome (not shown) which is removed by a spin trimming operation. After spin trimming, the sealing flange 14 of the container 12 defines an inner diameter which is less than that required for proper engagement with a cap (not shown), such as a linerless threaded cap or a snap-on cap. Additionally, the inner diameter of the sealing flange 14 has disruptions defined therein as an inherent result of the blow molding process. These disruptions, hereinafter referred to as V-grooves, are formed 180° apart on the inner diameter of the sealing flange 14 and are located where the pinch-off on the mold halves compress the molten parison during the molding process. If left on the sealing flange 14, the V-grooves can result in leakage around the cap. Additionally, because of the presence of the V-grooves and cooling of the molded container, the opening defined by the sealing flange 14 tends to ovalize after cooling. By properly trimming the inner diameter of the sealing flange 14, both the V-grooves and the ovality of the opening can be removed or corrected.

After the spin trimming operation, the container 12 is transferred to a post molding station where the present apparatus 10 is employed. At this station, the container 12 is positioned with its neck 16 within a nest 18 that accommodates any ovality on the outside of the neck 16.

The apparatus 10 itself includes a fixed position housing 20 in which is defined a longitudinal passageway or bore 22. At the lower end of the housing 20, portions of the housing 20 are formed so as to receive a die 24 and the nest 18 mentioned above. The die 24 is retained with the housing 20 in a stepped portion 30 by conventional means. Such conventional means can be through the use of threaded fasteners (generally seen in the alternate embodiment discussed below) or through the appropriate placement of the nest 18 in an additional step portion 32 in the housing 20 so as to captively retain the die 24 between the nest 18 and the housing 20. The nest 18 is similarly secured to the housing 20 by conventional means such as threaded fasteners. The die 24 itself includes portions 26 which define an aperture coaxial with the passageway 22 as generally indicated by axis 28.

Mounted within passageway 22 is a shaft 34. The shaft 34 is mounted for axial movement along the axis 28 and is accordingly supported by appropriate bearings 36. An actuator (not shown), such as a hydraulic cylinder or more preferably a pneumatic cylinder is used to advance and retract the shaft during operation of the apparatus 20 as more fully described below.

Figure 4:
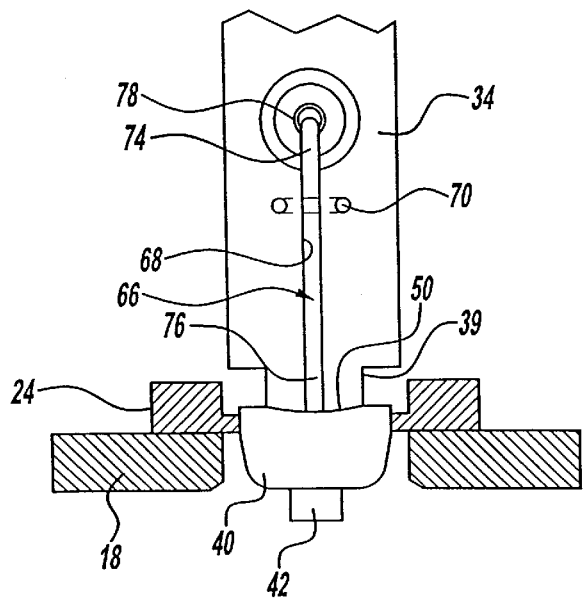
FIG. 4 is a side view of a portion of the apparatus seen in FIG. 1 illustrating the stripper arm mounted to the shaft and the radiused recess formed in the punch.

Mounted to the distal end 38 of the shaft 34 is a punch 40. The punch 40 is preferably mounted by a threaded fastener 42 engaging a threaded bore 44 in the distal end 38 of the shaft 34 to allow for replacement and servicing of the punch 40 as needed. The lower end of the shaft 34, adjacent to the distal end 38, is further provided wit a cut-out region 39 defining a diameter which is less than the diameter defined by the trailing edge 48 of the punch 40. The purpose for the cut-out region 39, perhaps best seen in FIG. 4, is further discussed below.

The exterior surface of the punch 40 is dome shaped between its leading end 46 and its trailing edge 48 and provided with a polished finish. The trailing edge 48 defines a circumferential cutting surface about the punch 40 and is sized to be in close-fit with those portions 26 defining the die aperture. In addition to extending circumferentially about the punch 40, the trailing edge 48 of the punch 40 is provided with a radiused recess 50 which is best seen in FIG. 4.

Also mounted to the shaft 34 is a knife 52. The knife 52 includes a mounting portion 54 and a cutting portion 56 having a cutting edge 58. The knife 52 is mounted to the shaft 34 by the positioning of the knife's mounting portion 54 within a slot 60 defined in the shaft 34. Securement is by conventional means such as threaded fasteners 62 engaging threaded bores 64 in the shaft 34. The cutting portion of the knife 56 extends into the cut-out region 39 in the shaft 34 such that the cutting edge 58 of the knife 52 is immediately adjacent but recessed relative to the trailing edge 48 of the punch 40.

Mounted within a slot 68 defined in the shaft 34 opposite of the knife 52, is a stripper arm 66. The mounting of the arm 66 to the shaft 34 is by means of a pivot mounting including a pivot pin 70 and bearing 72. The location of the pivot pin 72 is generally towards a proximal end 74 of the arm 66. The distal end 76 of the arm 66 is located adjacent to the punch 40 so as to coincide and extend into the radiused recess 50 defined therein. Accordingly, it can be seen that the length of the pivot pin 70 to the distal end 76 is greater than the length from the pivot pin 70 to the proximal end 74 of the arm 66.

Figure 2:
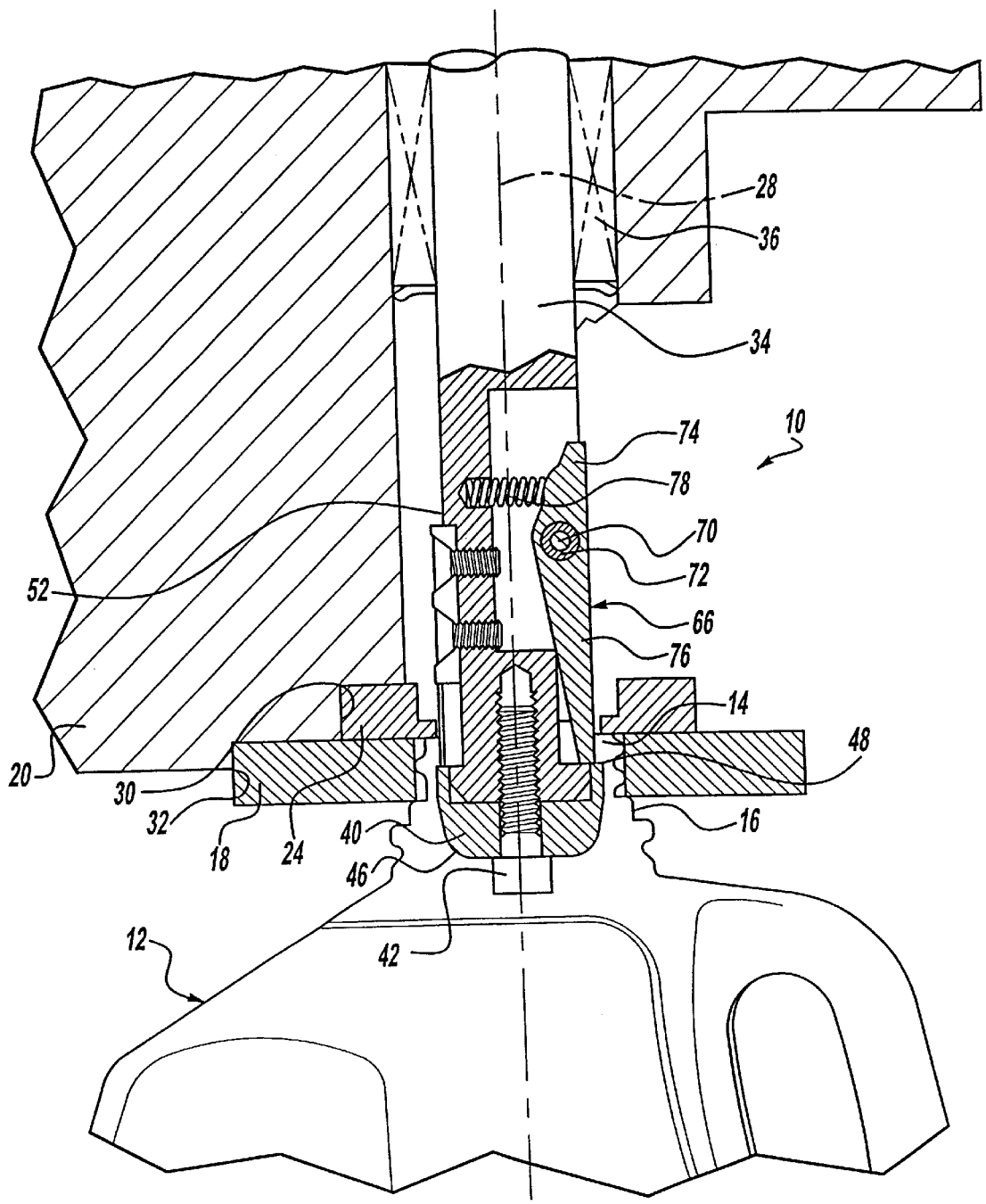
FIG. 2 is partial sectional view similar to that seen in FIG. 1, but further illustrating the punch having been extended into the neck of the container.
Figure 3:
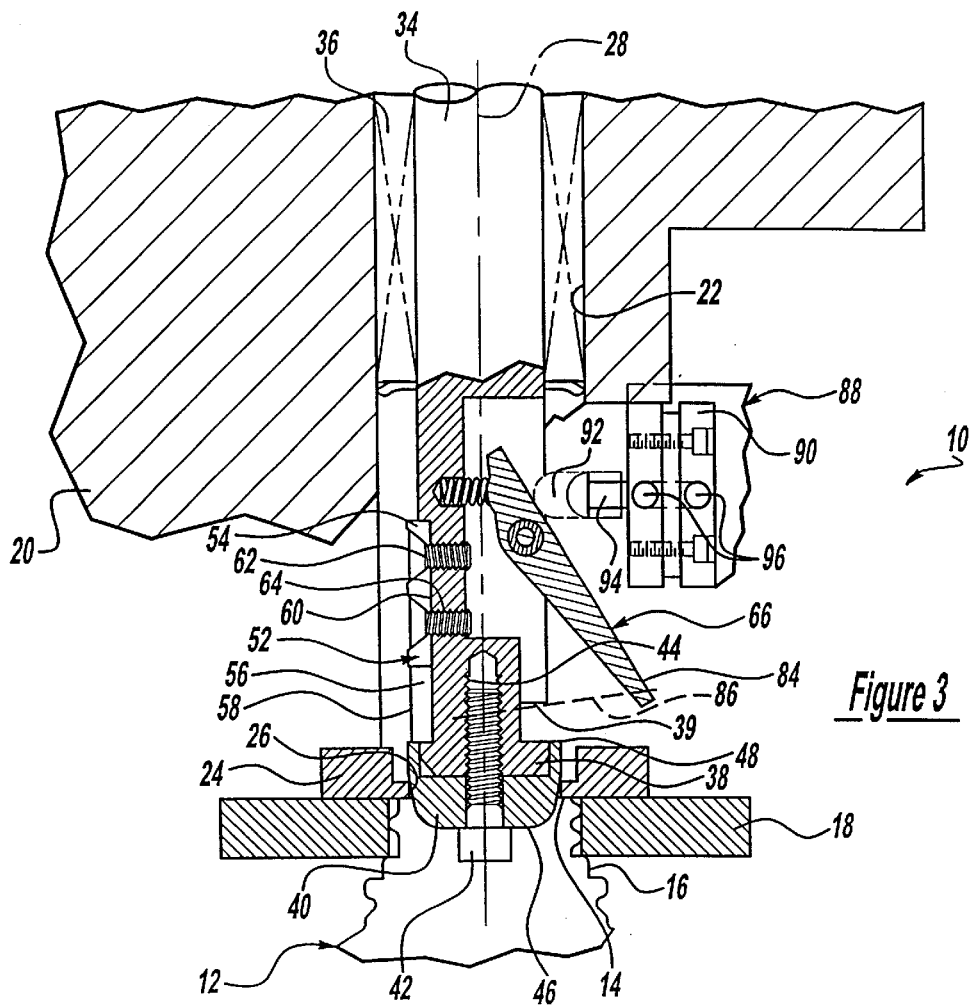
FIG. 3 is a partial sectional view similar to that seen in FIGS. 1 and 2 with the punch having been withdrawn back out of the neck of the container and with actuation of the stripper arm for removing the trimmed ring from about the shaft of the apparatus.

A coil spring or other biasing means 78 is located within a bore 80 defined in the shaft 34 and within the slot 68 so that one end of the spring 78 engages the proximal end 74 of the arm 66. In this way, the spring 78 biases the proximal end 74 radially away from the axis 28 while correspondingly biasing the distal end 76 of the arm 66 toward the axis 28. A stop or limiter 82 is formed in the slot 68 to engage the arm 66 and limit the depth to which the distal end 76 of the arm 66 can be biased toward the axis 28. As seen in FIGS. 1–3, the stop 82 is defined as a shoulder within the slot 68. When engaging the stop 82, a contact surface 84 of the distal end 76 is located adjacent to, but recessed from the trailing edge 48 of the punch 40.

During operation of the apparatus 10, once the container 12 is positioned within the nest 18, it can be seen that the sealing flange 14 lays against the die 24 and actually extends radially inward (approximately 1.0 to 1.5 mm) beyond the portions 26 defining the die aperture and the trailing edge 48. The shaft 34 of the apparatus 10 is then advanced so that the punch 40 is moved from a position generally outside of the container 12 to a position where the punch 40 is located interiorly of the neck 16 of the container 12. This interior position is illustrated in FIG. 2. As a result of movement of the shaft 34 and punch 40, the trailing edge 48 of the punch 40 has moved axially beyond the sealing flange 14 and the die 24. The domed and polished exterior surface of the punch 40 assists in allowing the punch 40 to enter into the neck of the container by minimizing the force required to deflect the sealing flange 14. With the punch 40 fully extended beyond the die 24, the sealing flange 14 flexes back to its original position as a result of the cut-out region 39 in the shaft and the recessed position of the knife 52 and distal end 76 of the arm 66. The shaft 34 has then retracted causing the trailing edge 48 to engage the sealing flange 14 and, in cooperation with the portions 26 defining the die aperture, cleanly shears a ring of material 86 from the sealing flange 14, leaving the sealing flange 14 with a circular aperture and removing the V-grooves and any ovality with the ring 86.

With the shaft 34 retracted, the severed ring 86 is generally retained about the shaft 34 and is in two-point contact with the distal end 76 of the arm 66 and the cutting edge 58 of the knife 52, again because of the cut-out region 39 formed in the shaft 34. By forming the arm 66 and the knife 62 integral to the shaft, it is possible to position these elements on the inside diameter of the sheared ring 86. Additionally, the radiused recess 50 formed in the punch 40 allows the distal end 76 of arm 66 to locally extend axially beyond the position of the sheared ring 86 on the non-recess portions of the punch 40 and flush to the top of the punch 40 in the radiused recess 50.

To remove the sheared ring 86 from about the shaft 34, the present invention is provided with a stripper actuator mechanism 88. The stripper actuator mechanism 88 includes a pancake cylinder 90 which is secured to the housing 20 of the apparatus 10. A head 92 is mounted to the pancake cylinder 90 by a shaft 94 extending into one side of the pancake cylinder 90. Accordingly, the head 92 is mounted for movement between an extended position and a retracted position as seen in FIG. 3 (the retracted position being shown in phantom). Control of the advancement and retraction of the head 92 is achieved through conventional methods, such as through the use of pneumatic or vacuum control lines 96 acting upon the cylinder 90.

The stripper actuator mechanism 88 is positioned in the apparatus 10 such that when the shaft 34 is retracted and the head 92 is advanced, the head 92 engages the proximal end 74 of the arm 66 moving the proximal end 74 toward the axis 28 and against the bias of the spring 78. As a result, the distal end 76 of the arm 66 rotates laterally away from the axis 28. As the distal end 76 pivots away from the axis 28, it pushes on the sheared ring 86 causing the ring 86 to engage the cutting edge 58 of the knife 52 on the opposing side of the shaft 34. Continued outward movement of the distal end 76 results in the sheared ring 86 being completely severed by the cutting edge 58 of the knife 52. After severing of the ring 86, a flow of high pressure air across the shaft 34 assists in removing the severed ring 86 from the housing 20. Once the ring 86 has exited the housing 20, the head 92 of the stripper actuator mechanism 88 is retracted allowing the arm 66 to return to its original position. The trimmed container 12 is then removed from the nest 18 and apparatus 10 is ready for another cycle.

Figure 5:
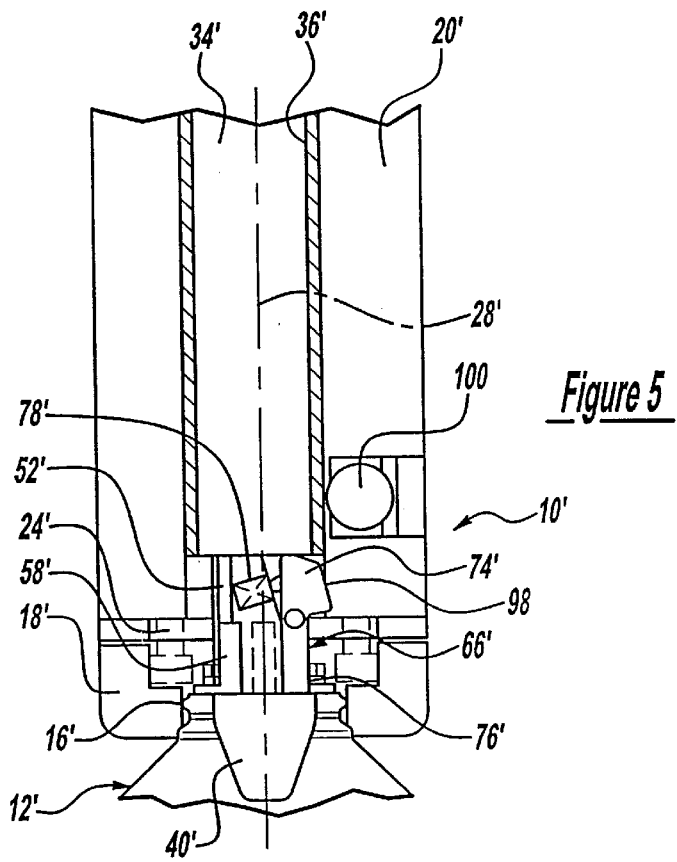
FIG. 5 is an alternative embodiment of the present invention illustrating the punch extended into the neck of the container.
Figure 6:
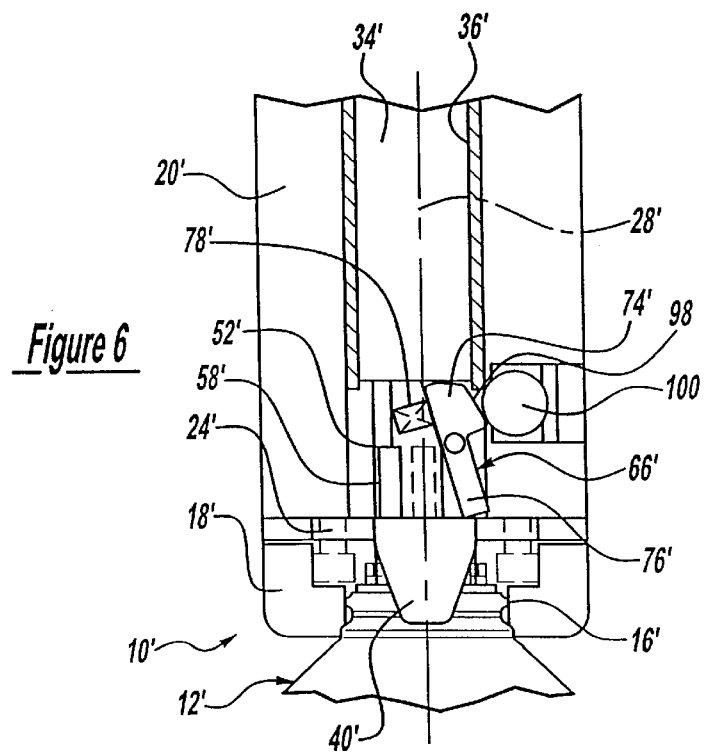
FIG. 6 is a view substantially similar to that seen in FIG. 5 illustrating actuation of the stripper arm according to a second embodiment of the present invention.

Referring now to FIG. 5, a second embodiment of the present invention is generally illustrated therein and designated at 10'. The embodiment seen in FIGS. 5 and 6 incorporate numerous elements in common with the previously discussed embodiment. Like elements are therefore designated with like reference numerals bearing the (') designation. Commonality of operation between the embodiments is high and, therefore, only distinctions will be hereafter discussed. Reference should be made to the earlier discussion for common operational and construction aspects.

The primary distinction between the second embodiment and the prior embodiment lies in the manner by which actuation of the stripper arm 66 is achieved and the structure therefor. In the present embodiment, the arm 66 is actuated during retraction of the shaft 34. Actuation occurs during retraction through engagement of an angled surface 98, formed on the outboard side of the proximal end 74' of the arm 66', with a fixed position member 100 secured to the housing 20'. Upon engagement of the angled surface 98 with the fixed position member 100, the proximal end 74' of the arm 66' is forced or otherwise moved toward the axis 28' and against the bias of the spring 78'. This results in the distal end 76' being rotated laterally away from the axis 28'. Again, as the distal end 76' pivots away from the axis 28', it pushes on the sheared ring 86 (not shown in FIGS. 5 and 6) causing the ring 86 to engage the cutting edge 58' of the knife 52' on the opposing side of the shaft 34'. Continued outward movement of the distal end 76' results in the sheared ring 86 being completely severed by the cutting edge 58' of the knife 52'. During the next advancement of the shaft 34', the spring 78' biases the proximal end 74' of the arm 66' radially outward, thereby biasing the distal end 76' toward the shaft 34', before the punch 40' has completely entered into the neck 16' of the container 12'.

While the above description constitutes the preferred embodiment of the present invention, it will be appreciated that the invention is susceptible to modification, variation and change without departing from the proper scope and fair meaning of the accompanying claims.

We claim:

1. An apparatus for trimming the neck of a blow molded plastic bottle, said apparatus comprising:

a body having portions defining a bore;

a shaft positioned in said bore and moveable between an extended position and a retracted position;

a reverse punch mounted on an end of said shaft and having a leading side and a trailing side defining a cutting edge circumferentially around said reverse punch, said cutting edge being greater in diameter than said shaft and defining an outer perimeter of said reverse punch, a portion of said outer perimeter being axially recessed relative to a remainder of said outer perimeter;

a die mounted to said body, portions of said die defining a die aperture sized for close fit with said cutting edge;

a knife mounted adjacent to said reverse punch;

a stripper arm having a distal end located adjacent to said recessed portion; and an actuator engageable with said stripper arm to move said distal end to a position located radially outward from the cutting edge.

2. An apparatus according to claim 1 wherein said stripper arm is pivotally mounted to said shaft.

3. An apparatus according to claim 2 wherein said stripper arm is pivotally mounted at a location between said distal end adjacent said reverse punch and an opposing end of said stripper arm.

4. An apparatus according to claim 1 wherein said distal end of said stripper arm is aligned with said recessed portion.

5. An apparatus according to claim 1 wherein said remainder of said outer perimeter and said cutting edge lie substantially in a plane.

6. An apparatus according to claim 5 wherein said plane is tansverse to a longitudinal axis of said shaft.

* * * * *